(12) United States Patent
Yamanouchi et al.

(10) Patent No.: US 8,101,262 B2
(45) Date of Patent: Jan. 24, 2012

(54) FIBER-REINFORCED PLASTIC AND PROCESS FOR PRODUCTION THEREOF

(75) Inventors: Masahiro Yamanouchi, Ehime (JP); Ichiro Taketa, Ehime (JP); Eisuke Wadahara, Ehime (JP); Akihiko Kitano, Ehime (JP)

(73) Assignee: Toray Industries, Inc. (JP)

(*) Notice: Subject to any disclaimer, the term of this patent is extended or adjusted under 35 U.S.C. 154(b) by 454 days.

(21) Appl. No.: 12/442,982

(22) PCT Filed: Apr. 18, 2007

(86) PCT No.: PCT/JP2007/058393
§ 371 (c)(1),
(2), (4) Date: Mar. 26, 2009

(87) PCT Pub. No.: WO2008/038429
PCT Pub. Date: Apr. 3, 2008

(65) Prior Publication Data
US 2010/0028616 A1 Feb. 4, 2010

(30) Foreign Application Priority Data
Sep. 28, 2006 (JP) .................................. 2006-264784

(51) Int. Cl.
*B32B 3/00* (2006.01)
*B29C 43/18* (2006.01)

(52) U.S. Cl. ........ 428/119; 428/98; 428/172; 428/297.1

(58) Field of Classification Search .................. 428/119, 428/98, 297, 297.1, 172
See application file for complete search history.

(56) References Cited

U.S. PATENT DOCUMENTS
4,543,288 A * 9/1985 Radvan et al. .............. 428/297.4

FOREIGN PATENT DOCUMENTS

| EP | 0 148 761 A2 | 7/1985 |
|---|---|---|
| JP | 56-095633 A | 8/1981 |
| JP | 60-158228 A | 8/1985 |
| JP | 61-287711 A | 12/1986 |
| JP | 63-087206 A | 4/1988 |
| JP | 7-076051 A | 3/1995 |
| JP | 2000120227 A * | 4/2000 |
| JP | 2004-209717 A | 7/2004 |

OTHER PUBLICATIONS

ITO, translation of JP-2000120227-A, Apr. 2000.*

* cited by examiner

*Primary Examiner* — Brent Ohern
(74) *Attorney, Agent, or Firm* — DLA Piper LLP (US)

(57) ABSTRACT

A fiber-reinforced plate-like plastic having a plate and a protrusion rising on the plate, wherein the plate and the protrusion each contain a laminated structure composed of plural reinforcing fiber sheets which each include many fibers of 10 to 100 mm in fiber length arranged in a fixed direction and at least two of the layers constituting the laminated structure are different in the direction of arrangement of reinforcing fibers and wherein at least part of the reinforcing fibers extend continuously from the plate to the protrusion and at least one of the layers constituting the laminated structure of the protrusion has a shape similar to the shape of the protrusion; and a process for the production of fiber-reinforced plastic which includes cutting a unidirectional prepreg sheet composed of many reinforcing fibers arranged in a fixed direction and a matrix resin into prepreg base material sheets with the above fiber length, laminating the prepreg base material sheets with the directions of arrangement of reinforcing fibers of the base material sheets being different from each other to form a prepreg laminate, and heating and pressure-molding this laminate in a mold provided with a recess for forming the production.

9 Claims, 6 Drawing Sheets

FIBER-REINFORCED PLASTIC AND PROCESS FOR PRODUCTION THEREOF

RELATED APPLICATIONS

This is a §371 of International Application No. PCT/JP2007/058393, with an international filing date of Apr. 18, 2007 (WO 2008/038429 A1, published Apr. 3, 2008), which is based on Japanese Patent Application No. 2006-264784, filed Sep. 28, 2006.

TECHNICAL FIELD

This disclosure relates to a fiber reinforced plastic which comprises a plate body having a plate portion and a protrusion portion rising from at least one surface of the plate portion, wherein the plate portion and the protrusion portion are formed with plural reinforcing fibers and a matrix resin integrated with the plural reinforcing fibers, and a production method thereof.

As a typical example of the plate body having the protrusion portion, a plate body having a rib or a boss is mentioned. This plate body is widely used as a structural member. As examples of this structural member, structural members such as in transport equipments including cars and sporting goods including bicycles are mentioned.

BACKGROUND

A fiber reinforced plastic constituted with a reinforcing fiber and a matrix resin has drawn attention in industrial applications since it is high in specific strength and specific modulus, excellent in mechanical characteristics, and has high performance characteristics such as weather resistance and chemical resistance, and its needs are increasing year by year.

To efficiently exhibit lightness which is one of the big characteristics of fiber reinforced plastic molded article, it has been done to form a protrusion portion called as rib on a surface of molded article. By this way, it is possible to increase rigidity and strength of the molded article without increasing thickness of the molded article.

To prevent a curl or the like of a broad flat portion of the molded article, a presence of the rib is effective. Other than the rib, in a structure constituted with plural members, a fitting called as boss used in concave portion or a protrusion portion for adjusting positions at connecting molded articles with each other are widely used.

As molding method of a fiber reinforced plastic, in particular, of a fiber reinforced plastic having high performance characteristics, it is most general to employ an autoclave molding in which semi-cured state products called as prepreg, in which reinforcing fibers are impregnated with a matrix resin, are laid up, and the matrix resin is cured by beating and pressing in a high temperature high pressure oven (autoclave), to be molded into a fiber reinforced plastic. As a molding method which is more excellent in productivity compared to the autoclave molding, RTM (resin transfer molding) molding, in which a fiber base material is shaped into a desired shape, and then impregnated with a resin, is also employed.

As configuration of the reinforcing fibers used in these molding methods, it is general to use continuous fibers in which high mechanical characteristics are easy to be achieved.

As means for forming a protrusion portion such as rib or boss to the fiber reinforced plastic molded article constituted with the continuous fibers, method of bonding a protrusion portion molded beforehand by autoclave molding or the like to a plate portion which is also molded beforehand, with an adhesive or the like, or insert injection molding in which a protrusion portion is molded to a plate portion molded beforehand by autoclave molding or the like, are mentioned.

However, in case of the former, it necessitates a very troublesome process in which a plate portion and a protrusion portion are prepared respectively, and further, they are bonded, and furthermore, there was a problem that an adhesion of the bonded portion must be considered. In case of the latter, since physical characteristics of the protrusion portion mostly formed by injection molding are low, its effect is small especially as a rib, in addition, adhesion properties between the plate portion and the protrusion portion are not good in some cases, and there was a problem that it is easy to be peeled off at the bonded portion.

As other means, a method in which a fiber base material is shaped into a shape of protrusion portion beforehand, and molded by an RTM molding or the like is mentioned, but there were problems that, since a lot of work and time is necessary for shaping the fiber base material, it cannot be said to be good in productivity, although it is better in productivity compared to autoclave molding, and only a protrusion portion of a simple shape can be molded, etc.

On the other hand, in case of a short fiber reinforced plastic of which reinforcing fiber length is about several to several ten mm, it is relatively easy to form a protrusion portion. For example, it is possible to employ, when the matrix resin is a thermosetting resin, press molding or the like such as by SMC (sheet molding compound) or BMC (bulk molding compound), and in case of a thermoplastic resin, injection molding or the like.

However, in the SMC or BMC, in its production process, since a distribution unevenness or an orientation unevenness of reinforcing fibers is unavoidable, there were problems that mechanical characteristics of molded article decreases or, its physical characteristic values vary widely. On the other hand, in the injection molding, since it is possible to mold only when a content of the reinforcing fibers is small and each of which length is short is used, mechanical characteristics of the molded article become very low. Accordingly, in these methods, there was a problem that it is difficult to produce a fiber reinforced plastic having a protrusion portion suitable for a structural member.

An attempt to solve problems of these prior arts is proposed (JP-S63-087206 A). In JP-S63-087206 A, a production method of molded article provided with a rib based on a press molding is disclosed. In the production method, by cutting fibers at the rib portion, the cut fiber ends are poured into the rib end to fill the fibers in the rib.

However, in the case where fibers are cut only at the rib portion, since fibers are not cut at other portion than the rib, fibers are bound as a whole and it is an actual circumstance that the fibers are difficult to be filled up to the rib end. Even when a molded article filled with the fibers up to the rib end could be made by this production method, although the rigidity in direction in which the rib is formed (in direction of rib height) is improved, the rigidity in rib thickness direction depends on, since the fibers are cut, the rigidity only of resin, and therefore the rigidity becomes very low, and the molded article cannot be used as an actual structural member in some cases.

As stated above, a fiber reinforced plastic having a protrusion portion capable of being molded easily, and in addition, excellent in mechanical characteristics has not been found, so far.

It could therefore be helpful to provide a fiber reinforced plastic, having a protrusion portion excellent in mechanical characteristics, in which the problems of prior arts are improved, and a production method thereof.

SUMMARY

We thus provide a fiber reinforced plastic comprising a plate body having a plate portion and a protrusion portion rising from at least one surface of the plate portion, in which the plate portion and the protrusion portion comprise plural reinforcing fibers and a matrix resin integrated with the plural reinforcing fibers, wherein
(a) the plural reinforcing fibers in the plate portion and the protrusion portion are formed with at least two reinforcing fiber layers different in direction of arrangement of the plural reinforcing fibers in the respective layers,
(b) respective fiber lengths of the plural reinforcing fibers in each of the reinforcing fiber layers is 10 to 100 mm,
(c) at least a part of the reinforcing fibers in each of the reinforcing fiber layers extend continuously from the plate portion to the protrusion portion, and
(d) at least one reinforcing fiber layer of the at least two reinforcing fiber layers in the protrusion portion has a shape extending along a shape of the protrusion portion.

It is preferable in the fiber reinforced plastic that the plate portion contains a reinforcing fiber base layer integrated with the plate portion on the surface opposite to the surface on which the protrusion portion locates, wherein reinforcing fibers in the reinforcing fiber base layer are plural continuous reinforcing fibers.

It is preferable in the fiber reinforced plastic that a thickness of the protrusion portion is 0.1 to 4 times of a thickness of the plate portion.

It is preferable in the fiber reinforced plastic that a height of the protrusion portion is 0.2 to 50 times of a thickness of the plate portion.

It is preferable in the fiber reinforced plastic that a transversal cross-sectional shape of the protrusion portion is a rectangle or circle.

It is preferable in the fiber reinforced plastic that the matrix resin is a thermosetting resin.

It is preferable in the fiber reinforced plastic that the reinforcing fiber is a carbon fiber.

A method for producing a fiber reinforced plastic which achieves such purposes is as follows.

A method for producing a fiber reinforced plastic comprising a plate body having a plate portion and a protrusion portion rising from at least one surface of the plate portion, in which the plate portion and the protrusion portion comprise plural reinforcing fibers and a matrix resin integrated with the plural reinforcing fibers, which comprises
(a) a laminate preparation step for preparing a prepreg laminate which comprises at least two sheets of prepreg base material each of which comprises a reinforcing fiber sheet comprising plural reinforcing fibers each of which has a length of 10 to 100 mm and which are unidirectionally arranged in turn, and a matrix resin of uncured state impregnated wholly or partially into the reinforcing fiber sheet, are laminated in a condition different in the direction of arrangement of the reinforcing fibers,
(b) a molding device preparation step for preparing a molding device for molding the plate body, which comprises one mold having a concave portion for forming the protrusion portion and another mold for forming the plate portion in company with the one mold,
(c) a laminate setting step for setting the prepreg laminate prepared in the laminate preparation step between the molds of the molding device prepared in the molding device preparation step,
(d) a plate body forming step for forming the plate body in which the plate portion and the protrusion portion are shaped by heating and pressing the prepreg laminate set in the molds in the laminate setting step and the matrix resin is solidified, and
(e) a plate body demolding step for taking out the plate body, formed in the plate body forming step, from the molds.

It is preferable in the method for producing a fiber reinforced plastic that the prepreg laminate contains a reinforcing fiber base layer integrated with the prepreg laminate on the surface opposite to the surface on which the protrusion portion is formed, wherein reinforcing fibers in the reinforcing fiber base layer are plural continuous reinforcing fibers.

It is preferable in the method for producing a fiber reinforced plastic that the matrix resin is a thermosetting resin.

It is preferable in the method for producing a fiber reinforced plastic that, while a temperature of the molds is kept constant, the plate body forming step and the plate body demolding step are carried out.

It is preferable in the method for producing a fiber reinforced plastic that a viscosity of the thermosetting resin in the plate body forming step is in the range of 0.1 to 100 Pa·s.

It is preferable in the method for producing a fiber reinforced plastic that a temperature T of the molds and an exothermic peak temperature Tp of the thermosetting resin in plate body forming step satisfy the relation of $Tp-60 \leq T \leq Tp+20$.

In the method for producing a fiber reinforced plastic, the plural reinforcing fibers having the length of 10 to 100 mm in the prepreg laminate prepared in the laminate preparation step are prepared by putting cuts into plural reinforcing fibers arranged unidirectionally under a cutting pitch having the length of 10 to 100 mm, in which one or both of the positions and directions of the cuts are different at least between the prepreg base material positioned adjacently.

In the fiber reinforced plastic, each layer constituting the laminate structure of the plate portion and the protrusion portion contains discontinuous reinforcing fibers, and in addition, at least a part of the reinforcing fibers extend continuously from the plate portion to the protrusion portion, and at least one of layers constituting the laminate structure of the protrusion portion has a shape extending along the shape of protrusion portion. By this structure, the protrusion portion in the fiber reinforced plastic has desired mechanical characteristics.

By the method for producing a fiber reinforced plastic, especially a fall in production process of mechanical characteristics of the protrusion portion, such as rib or boss which are important in structural member constitution, can be minimized, and in addition, the fiber reinforced plastic can be produced simply.

The fiber reinforced plastic is preferably used as, for example, a structural member of transport equipments (such as cars, aircrafts or ships), a structural member of industrial machines, a structural member of precision instruments, or a structural member of sporting goods (such as bicycle or golf).

REFERENCE NUMBERS LIST

Figure 1:
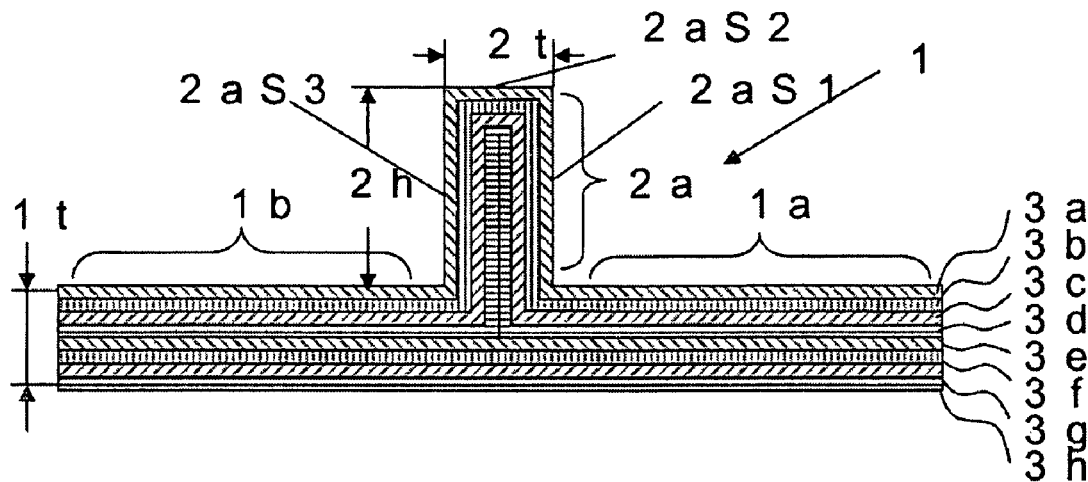
FIG. 1 is a schematic longitudinal cross-sectional view of an example of the fiber reinforced plastic.

1: plate body
1a and 1b: plate portion
1t: thickness of plate portion
2a: protrusion portion
2aS1, 2aS2 and 2aS3: surface in protrusion portion
2h: height of protrusion portion
2t: thickness of protrusion portion
3a-3h: reinforcing fiber layer coexisting with matrix resin
4: reinforcing fiber
4A2a, 4B2a and 4C2a: protrusion portion
5: plate body
5a-5d: reinforcing fiber layer in laminated prepreg base material
6: resin region
7a-7k: surface forming outer surface of protrusion portion
8a-8o: reinforcing fiber layer coexisting with matrix resin in protrusion portion
9: fiber length direction
10: direction perpendicular to fiber
11: unidirectional prepreg sheet
12: cut
13, 13A and 13B: upper mold
14, 14A1, 14A2, 14B1 and 14B2: rib groove
51a and 51b: plate portion
52a: protrusion portion
101: plate body
111: plate body

DETAILED DESCRIPTION

A fiber reinforced plastic is constituted of a plate body having a plate portion and a protrusion portion rising from at least one surface of the plate portion, and the plate portion and the protrusion portion are constituted with plural reinforcing fibers and a matrix resin integrated with the reinforcing fibers, and in addition, (a) the plural reinforcing fibers in the plate portion and the protrusion portion are constituted with at least two reinforcing fiber layers different in direction of arrangement of the plural reinforcing fibers in the respective layers, (b) respective fiber lengths of the plural reinforcing fibers in the each reinforcing fiber layer is in the range of 10 to 100 mm, (c) at least a part of the reinforcing fibers of the each reinforcing fiber layer extend continuously from the plate portion to the protrusion portion, and (d) at least one reinforcing fiber layer of the at least two reinforcing fiber layers in the protrusion portion has a shape extending along a shape of the protrusion portion.

Next, this disclosure is further explained by the examples with reference to the drawings.

In FIG. 1, the fiber reinforced plastic is constituted of a plate body 1. The plate body 1 is formed with plural reinforcing fiber layers 3a, 3b, 3c, 3d, 3e, 3f, 3g and 3h coexisting with a matrix resin. The each layer 3a, 3b, . . . 3h is indicated by the same hatching in each layer. The plate body 1 has a right and left plate portions 1a and 1b and a protrusion portion 2a. The reinforcing fiber layers 3a, 3b, 3c and 3d form skin layers of the right and left plate portions 1a and 1b, and these skin layers rise to form the protrusion portion 2a. The reinforcing fiber layers 3e, 3f, 3g and 3h form a base layer of the plate body 1.

Among the reinforcing fiber layers 3a, 3b, 3c, 3d, 3e, 3f, 3g and 3h which form the plate body 1, each reinforcing fiber layer 3a, 3b, 3c or 3d which forms at least the skin layer is constituted with a reinforcing fiber sheet in which plural reinforcing fibers are arranged unidirectionally. In the structure shown in FIG. 1, the reinforcing fiber layers 3e, 3f, 3g and 3h which form the base layer of plate body 1, are also constituted with a reinforcing fiber sheet in which plural reinforcing fibers are arranged unidirectionally.

At least a part of plural reinforcing fibers in the reinforcing fiber layers 3a, 3b, 3c and 3d which form the skin layer locates continuously from the plate portions 1a and 1b to the protrusion portion 2a. Further, the reinforcing fiber layers 3a, 3b, 3c and 3d which form the skin layer have a shape extending along a shape of the protrusion portion 2a, in the protrusion portion 2a.

The protrusion portion 2a of FIG. 1 shows a rib which is one of its structures. The fiber reinforced plastic constituted with the plate body 1 is aimed for its rigidity increase and weight reduction by the presence of the rib 2a. By the rib 2a, curl of the plate body 1 is reduced and dimensional stability of the plate body 1 increases. On the other hand, when the protrusion portion 2a is made as a boss which is one of the other structures, it becomes possible to fit plural members while precisely positioning or to embed other parts with reference to the boss 2a.

The protrusion portion 2a is usually provided on one surface of the member (the plate body 1) in many cases, but as required, the protrusion portion 2a may be provided on both surfaces of the member.

Fiber lengths of the reinforcing fiber, in respective ones of the reinforcing fiber layers 3a, 3b, 3c and 3d which form at least the skin layer, are 10 to 100 mm. In the case where the fiber length of the reinforcing fiber is shorter than 10 mm, reinforcing effect of the plate body 1 by the reinforcing fiber, especially, by the protrusion portion 2a becomes small, to lower mechanical characteristics of the plate body 1. On the other hand, in the case where the fiber length of the reinforcing fiber is longer than 100 mm, the reinforcing fiber cannot be sufficiently filled to the tip end of protrusion portion 2a.

The reinforcing fibers in the reinforcing fiber layers 3e, 3f, 3g and 3h which form the base layer of plate body 1 may be continuous reinforcing fibers or may be discontinuous reinforcing fibers, for example, may be discontinuous reinforcing fibers which are reinforcing fibers of fiber length 10 to 100 mm arranged longitudinally. In the case where the skin layer and the base layer of the plate body 1 are desired to be made clearly separately, or in the case where better mechanical characteristics are desired to be exhibited, it is preferable that reinforcing fibers in at least a part of the reinforcing fiber layers are continuous reinforcing fiber. In the case where better mechanical characteristics are desired to be exhibited, it is more preferable that all reinforcing fibers in the reinforcing fiber layer which form the base layer are constituted with continuous reinforcing fibers.

To surely fill the reinforcing fibers up to the tip end of the protrusion portion 2a, it is preferable that the fiber length, of at least a part of the reinforcing fibers of the reinforcing fiber layers which form the base layer, is 10 to 100 mm. In particular, by being the fiber length of the reinforcing fibers of all the reinforcing fiber layers which form the base layer in this range, it is possible to best ensure the filling of reinforcing fibers to the protrusion portion 2a.

The reinforcing fiber layers 3a, 3b, 3c and 3d which form the skin layer form the plate portions 1a and 1b and the protrusion portion 2a. That is, the skin layer in the plate portions 1a and 1b and the protrusion portion 2a are formed by the same reinforcing fiber layers 3a, 3b, 3c and 3d. When the skin layer in the plate portions 1a and 1b and the protrusion portion 2a have different reinforcing fiber layer structures, a residual stress becomes easy to be generated in the boundary portion of both of them by a difference of heat shrinkage or linear expansion coefficient, and as a result, it may cause a crack generation or a curl of the fiber reinforced plastic.

Furthermore, at least a part of the reinforcing fibers of each layer which constitutes the laminate structure are continuous from the plate portions 1a and 1b to the protrusion portion 2a. By this way, a strong integral structure is formed between the protrusion portion 2a and the plate portions 1a and 1b, and the function as a protrusion portion such as rib or boss is sufficiently exhibited. In the case where the reinforcing fibers constituting the laminate structure of the protrusion portion 2a are not continuous with the reinforcing fiber constituting the laminate structure of the plate portions 1a and 1b, strength of a root portion of the protrusion portion 2a decreases, and a breakage or peeling becomes easy to occur at the root portion.

Figure 2:
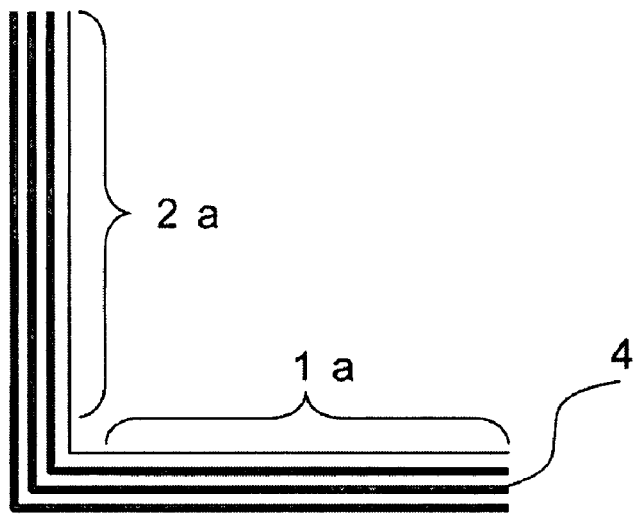
FIG. 2 is a schematic longitudinal cross-sectional view explaining a state of the reinforcing fibers, which are continuous from the plate portion to the protrusion portion, of the fiber reinforced plastic of FIG. 1.

A state in which the reinforcing fibers are continuous from the plate portions 1a and 1b to the protrusion portion 2a is shown in FIG. 2. What the reinforcing fibers are continuous from the plate portions 1a and 1b to the protrusion portion 2a means, as shown in FIG. 2, a state in which the reinforcing fiber 4 is present continuously from the plate portion 1a to the protrusion portion 2a.

Regarding the laminate structure of the reinforcing fiber layer, when explained using the structure shown in FIG. 1, in the case where a longitudinal cross-section of the plate body 1 is observed, a layer in which the reinforcing fiber is oriented in a certain direction (e.g., layer 3a) and a layer in which the reinforcing fiber is oriented in a different direction (e.g., layer 3b) form separate layers, respectively, and the laminate structure has a structure in which plural layers 3a, 3b, ... 3h constituted with those separate layers are superposed in turn in thickness direction of the plate body 1.

Figure 3A:
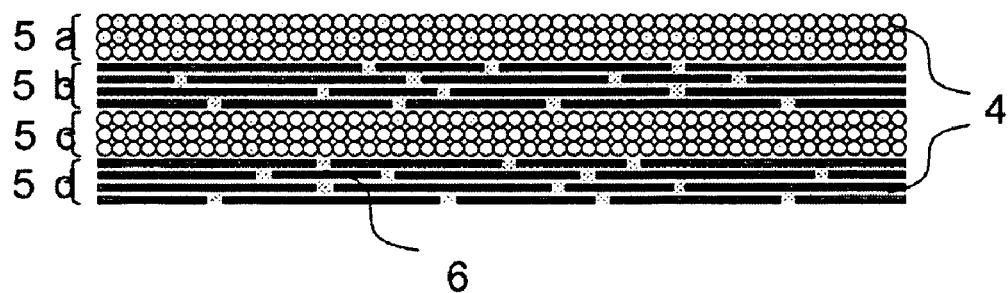
FIG. 3A is a longitudinal cross-sectional schematic view explaining an example of laminate state of layers, respectively constituted with a reinforcing fiber sheet constituted with plural reinforcing fibers arranged unidirectionally and a matrix resin, of the fiber reinforced plastic.
Figure 3B:
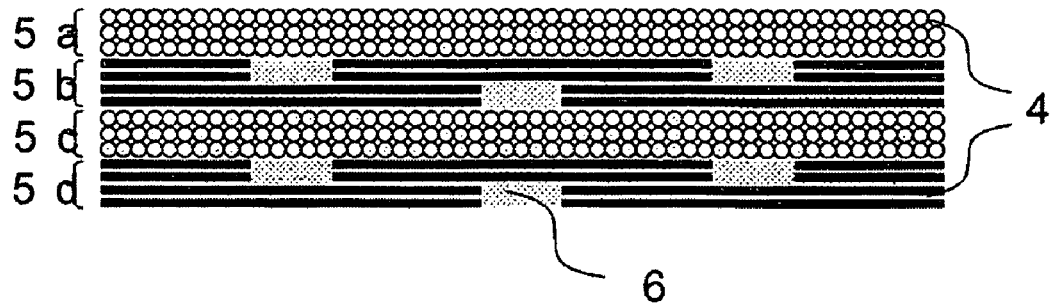
FIG. 3B is a longitudinal cross-sectional schematic view explaining another example of laminate state of layers, respectively constituted with a reinforcing fiber sheet constituted with plural reinforcing fibers arranged unidirectionally and a matrix resin, of the fiber reinforced plastic.
Figure 3C:
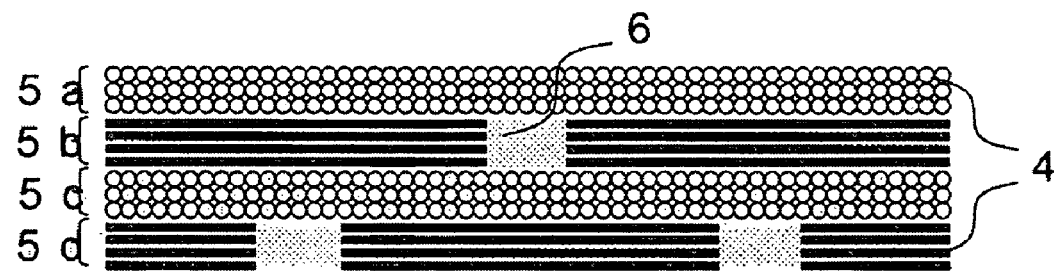
FIG. 3C is a longitudinal cross-sectional schematic view explaining still another example of laminate state of layers respectively constituted with a reinforcing fiber sheet constituted with plural reinforcing fibers arranged unidirectionally and a matrix resin of the fiber reinforced plastic.

Examples of this laminate structure are shown in FIG. 3A, FIG. 3B and, FIG. 3C. In these figures, like the layers 5b and 5d constituted with plural reinforcing fibers arranged in a specified direction (horizontal direction in the figures) and a matrix resin, even the continuity of the reinforcing fibers is broken and a resin region 6 is present in a broken portion, in the adjacent layers 5a and 5c, reinforcing fibers are arranged in a different direction (direction perpendicular to paper in the figures). The reinforcing fibers in each layer are respectively segmented in length direction in a fiber length of 10 to 100 mm, but the reinforcing fibers are supported in length direction by the adjacent layer with each other. Accordingly, although the reinforcing fibers present in the layer are segmented in its length direction, each segment of the reinforcing fibers is present in the same layer. Respective segments of the reinforcing fibers in such an arrangement are taken as a whole and referred to as the reinforcing fiber layer.

In the case where several sheets of SMC or BMC, in which reinforcing fibers are arranged randomly, are superposed and subjected to a press molding, since reinforcing fibers of limited length are independently and randomly arranged and superposed on its side face, respectively, a clear layer is not formed in thickness direction of the fiber reinforced plastic, and such a state of presence of the reinforcing fiber is not included in a state of the reinforcing fibers which form a reinforcing fiber layer.

At least one layer among the layers 3a, 3b, 3c and 3d which forms the protrusion portion 2a has a shape extending along a shape of the protrusion portion 2a. What the layer is a shape extending along the shape of the protrusion portion 2a, means a state in which the layer, for example, the layer 3a has the same directions as the respective directions of the respective surfaces 2aS1, 2aS2 and 2aS3 (refer to FIG. 1) which constitutes the protrusion portion 2a.

Figure 4A:
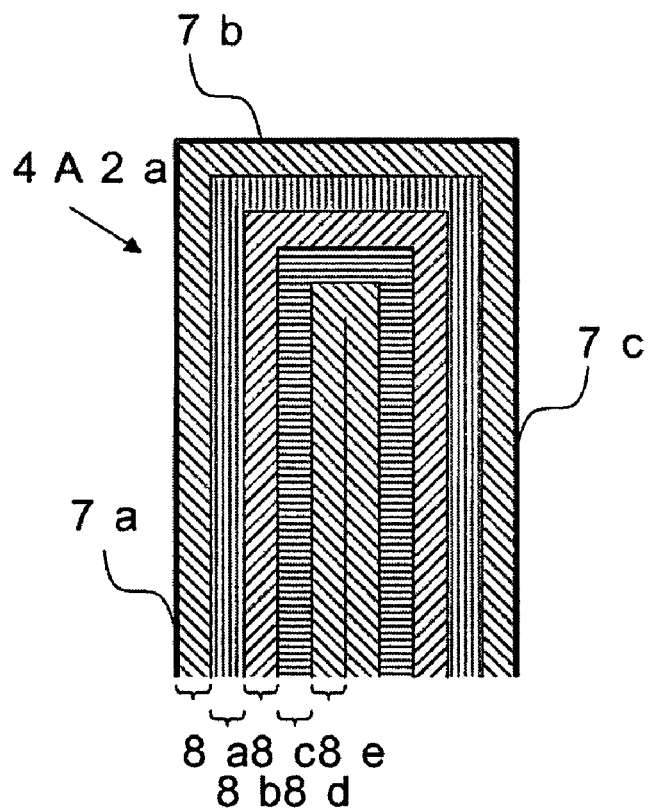
FIG. 4A is a longitudinal cross-sectional schematic view explaining layer structure of reinforcing fibers of an example of the protrusion portion of the fiber reinforced plastic.
Figure 4B:
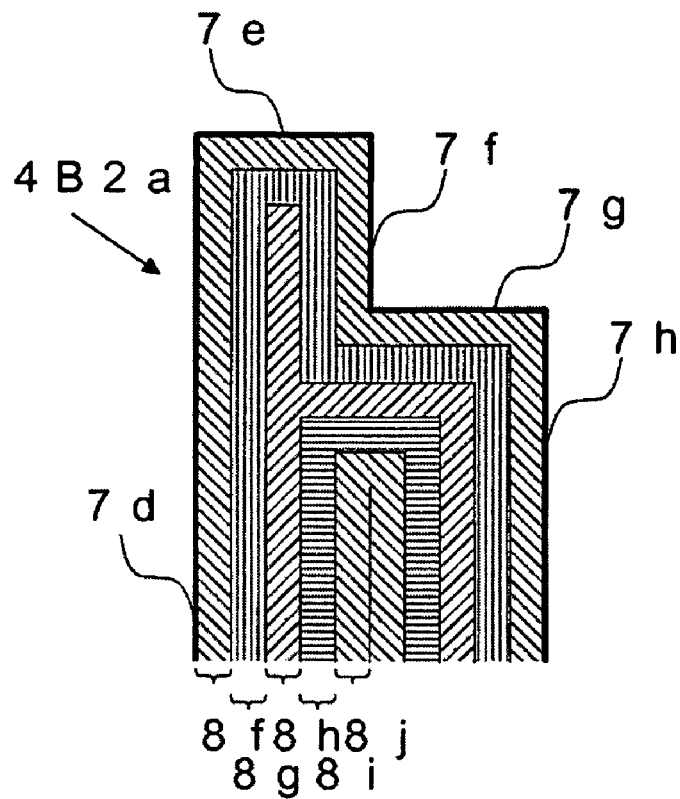
FIG. 4B is a longitudinal cross-sectional schematic view explaining layer structure of reinforcing fibers of another example of the protrusion portion of the fiber reinforced plastic.
Figure 4C:
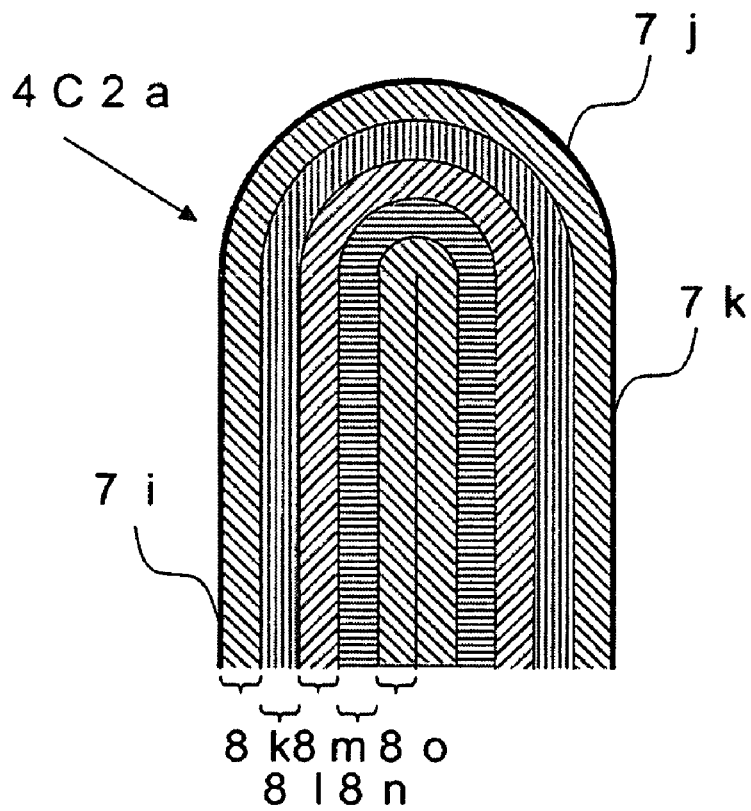
FIG. 4C is a longitudinal cross-sectional schematic view explaining layer structure of reinforcing fibers of still another example of the protrusion portion of the fiber reinforced plastic.

Examples of forming such layers are shown in FIGS. 4A, 4B and 4C. In the longitudinal cross-section of a protrusion portion 4A2a shown in FIG. 4A, the protrusion portion 4A2a has three planes 7a, 7b and 7c on the right and left sides and the top. In the longitudinal cross-section of a protrusion portion 4B2a shown in FIG. 4B, the protrusion portion 4B2a has five planes 7d, 7e, 7f, 7g and 7h on the right and left sides, the top, the right side of the top, and the top of stepped portion. In the longitudinal cross-section of a protrusion portion 4C2a shown in FIG. 4C, the protrusion portion 4C2a has planes 7i and 7k, and a curved surface 7j on the right and left sides and the semicircular top.

In the protrusion portion 4A2a shown in FIG. 4A, layers 8a, 8b, 8c, 8d and 8e which constitute the protrusion portion 4A2a respectively locate in direction along the respective surfaces. In the protrusion portion 4B2a shown in FIG. 4B, layers 8f, 8g, 8h, 8i and 8j which constitute the protrusion portion 4B2a respectively locate in direction along the respective surfaces. In the protrusion portion 4C2a shown in FIG. 4C, layers 8k, 8l, 8m, 8n and 8o which constitute the protrusion portion 4C2a respectively locate in direction along the respective surfaces. The shape extending along the shape of protrusion portion means that center surface of a layer corresponding to a surface constituting the protrusion portion is substantially parallel to the surface. The term "substantially parallel" is used since it is necessary to give a broadness to the meaning of "parallel" since it is not ordinary that center surface of a layer is a precise plane. A case in which center surface of a layer corresponding to a layer constituting the protrusion portion is in a deviation of surface of the layer thickness or less, is referred to as "substantially parallel."

Figure 5:
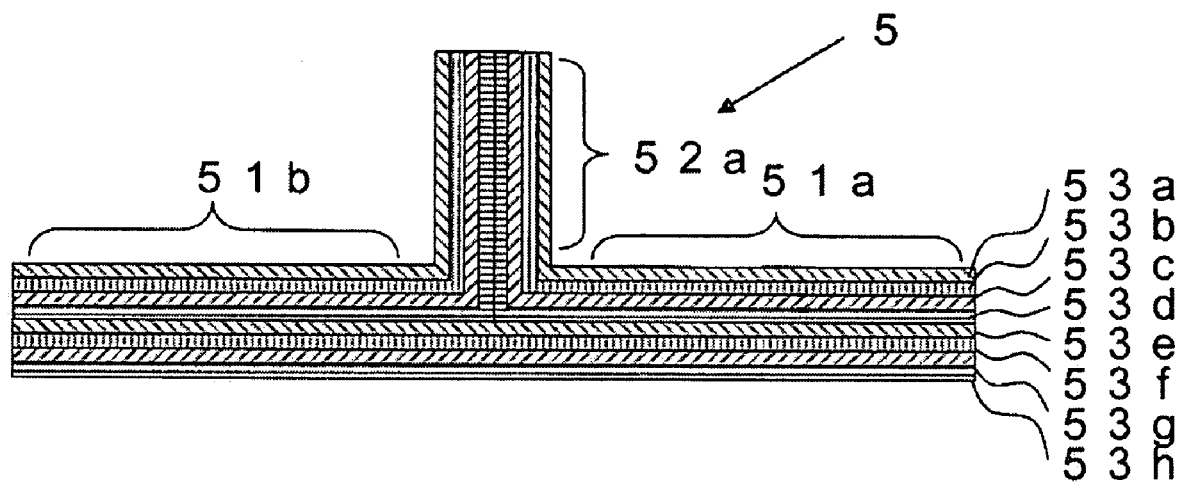
FIG. 5 is a schematic longitudinal cross-sectional view of an example of conventional fiber reinforced plastics.

A conventional plate body (fiber reinforced plastic) 5 is shown in FIG. 5. In FIG. 5, the plate body 5 is constituted with plate portions 51a and 51b, and a protrusion portion 52a. The plate portion 51a has a laminate structure of reinforcing fiber layers 53a, 53b, 53c, 53d, 53e, 53f, 53g and 53h, and the protrusion portion 52a has a laminate structure of reinforcing fiber layers 53a, 53b, 53c and 53d. The reinforcing fiber of the protrusion portion 52a is continuous with the reinforcing fiber of the plate portions 51a and 51b. However, the layers 53a, 53b, 53c and 53d do not extend along a shape of the protrusion portion 52a at the tip end of the protrusion portion 52a. That is, in the plate body 5, the layer in the protrusion portion 52a has not a similar shape to the shape of the protrusion portion 52a. In this case, when a stress is added to the protrusion portion 52a, the tip end of the protrusion portion 52a becomes a starting point of breakage and causes a decrease of physical characteristics of the plate body 5.

Unless otherwise noted, "plate portion" refers to a plate portion of its surface shape is a simple curved surface, quadric surface, spherical surface or the like having a curvature of 1/100 or less including plane.

As a method of forming the protrusion portion, there is a method for forming the protrusion portion by pressing a laminate of intermediate base material such as prepreg or semipreg in a two-sided mold having a concave portion for forming the protrusion portion in at least one mold. The mechanism of the protrusion portion being formed in this way is not clear, but it is estimated as follows.

First, in a two-sided mold, by pressing a laminate which is an intermediate base material constituted with limited length reinforcing fibers of fiber length 10 to 100 mm, each layer of the laminate flows to the direction of laminate surface (inner layer direction), while maintaining a laminate state. When flow to the inner layer direction is saturated, and when there is a concave space in one mold, the laminate also flows, while maintaining the laminate state, to the concave space, that is, to perpendicular direction or to a direction having a certain angle (outer layer direction) to the direction of the initial laminate surface, to penetrate into the space. It is estimated that the protrusion portion is formed by the laminate penetrated into the space. In this flow step, since the reinforcing fibers are not broken, the plate body (fiber reinforced plastic) to be formed contains reinforcing fibers of fiber length 10 to 100 mm which corresponds to the fiber length of reinforcing fiber of the starting material.

By the presence of plural layers of reinforcing fiber layers different in orientation direction of reinforcing fiber, the protrusion portion becomes excellent in dimensional stability. In the case where orientation direction of the reinforcing fiber is one direction only, the protrusion portion is easy to cause a curl or the like due to anisotropy of heat shrinkage or linear expansion coefficient, and dimensional accuracy is impaired. Furthermore, in the case where the protrusion portion is a rib, and in the case where stresses in two directions are added or in case where a tortuous stress is added to the rib, in the case where an orientation direction of reinforcing fiber is one direction only, depending on adding direction of the stress, strength or rigidity as a rib is insufficient. For that reason, reinforcing fiber layers of at least two layers different in orientation direction of the reinforcing fiber with each other becomes necessary. Among them, it is preferable that the plural reinforcing fiber layers are an isotropic laminate such as of $[0/90]_{nS}$, $[0/\pm 60]_{nS}$ or $[+45/0/-45/90]_{nS}$, and in addition, have a symmetrical laminate structures in consideration of such as reduction of curl of the plate body (fiber reinforced plastic) itself.

As a transversal cross-sectional shape of the protrusion portion of the fiber reinforced plastic (plate body), for example, there is a polygon (e.g., rectangle), circle or ellipse, and as a longitudinal cross-sectional shape, for example, there is square (e.g., rectangle), triangle or semicircle. In the case where the protrusion portion is a rib, a plate-like protrusion portion of which transversal cross-sectional shape is a rectangle and longitudinal cross-sectional shape is a rectangle, or a rod-like protrusion portion of which transversal cross-sectional shape is circle and longitudinal cross-sectional shape is rectangle, are preferably used. In the case where the protrusion portion is a boss, a protrusion portion of its entire shape is semisphere, polygonal columnar, circular columnar, polygonal conical or circular conical are preferably used.

It is preferable that a height $2h$ (refer to FIG. 1) of the protrusion portion is 0.5 to 50 times of a thickness $1t$ (refer to FIG. 1) of the plate portion, and to be 1 to 25 times is more preferable. When the height $2h$ of the protrusion portion is in that range, effect as the protrusion portion is easy to be exhibited. In the case where the height $2h$ of the protrusion portion is smaller than 0.5 times of the thickness $1t$ of the plate portion, for example, when the protrusion portion is a rib, effect of rigidity increase by the rib may decrease. On the other hand, in the case where the height $2h$ of the protrusion portion is larger than 50 times of the thickness $1t$ of the plate portion, the protrusion portion may become difficult to form the layer structure.

In the case where a shape of the protrusion portion is the above-described plate-like or rod-like, it is preferable that a thickness $2t$ of the protrusion portion (refer to FIG. 1) is 0.1 to 4 times of the thickness $1t$ of the plate portion and to be 0.5 to 3 times is more preferable. The thickness $2t$ of the protrusion portion is in that range, effect as the protrusion portion becomes easy to be exhibited. In the case where the thickness $2t$ of the protrusion portion is smaller than 0.1 times of the thickness $1t$ of the plate portion, for example, when the protrusion portion is a rib, effect of rigidity increase by the rib may become small, and when the protrusion portion is a boss, a dimensional accuracy of fitting portion may not be exhibited. On the other hand, in the case where the thickness $2t$ of the protrusion portion is larger than 4 times of the thickness $1t$ of the plate portion, a material balance between the plate portion and the protrusion portion becomes difficult to be appropriately made, and it may become difficult to make the plate portion and the protrusion portion into a similar layer structure.

An example of the fiber reinforced plastic (plate body) is produced by laminating a plural of prepregs or semipregs constituted with a reinforcing fiber sheet in which reinforcing fibers of fiber length 10 to 100 mm are arranged in length direction and a matrix resin to obtain an integrated laminate, and the laminate is shaped and solidified by pressing in a mold of which temperature T is substantially constant, and it is demolded while the mold temperature T is maintained.

If the matrix resin is a thermosetting resin, handling properties are good in the case where reinforcing fiber sheet having a fiber length of 1 to 100 mm is handled as a prepreg or semipreg, in addition, a viscosity of the matrix resin can be set lower than in the case of a thermoplastic resin, and accordingly, a material design in which the reinforcing fiber layer can flow easily becomes easy. As a result, a desired protrusion portion can easily be formed on the plate body.

As the thermosetting resin, an epoxy resin, an unsaturated polyester resin, a vinylester resin, a phenol resin, an acrylic resin, etc., are mentioned, and a mixture thereof is also acceptable. Among them, as the thermosetting resin, an epoxy resin with which a fiber reinforced plastic excellent in mechanical characteristics can be obtained is especially preferable.

The prepreg and semipreg are intermediate base materials of semi-cured state in which reinforcing fibers are completely or partially impregnated with a matrix resin, respectively. When a reinforcing fiber sheet of which fiber is segmented in length direction is handled in a configuration of the prepreg or semipreg, its handling becomes very easy. A unidirectional prepreg sheet or unidirectional semipreg sheet constituted with unidirectionally paralleled plural reinforcing fibers and a matrix resin can easily be designed into a laminate or plate body having desired characteristics by controlling laminate condition of these plural sheets such that directions of arrangement of the reinforcing fibers are different. Since the direction of arrangement of the reinforcing fibers is one direction, it is easy to increase content of the reinforcing fibers of prepreg, and it is possible to prevent a decrease of strength due to a crimp of the reinforcing fibers. Therefore, it can be said that a use of the prepreg or semipreg is suitable for preparing a fiber reinforced plastic having a high strength and high modulus.

The prepreg or semipreg is processed into a fiber reinforced plastic via a pressing and heating step in an autoclave molding, oven molding, or, press molding, and furthermore, a solidifying step of the matrix resin.

Among these molding methods, when productivity and moldability are considered, press molding method by a press machine is preferably employed. Since the press molding method is simple compared to other molding methods, in preparation of the molding, and furthermore, also in post treatment of the molding, it is overwhelmingly excellent in productivity. Furthermore, in the case where the matrix resin is a thermosetting resin, it is possible to demold while mold temperature T is maintained substantially constant. Accordingly, the cooling step of mold which becomes necessary when the matrix resin is a thermoplastic resin can be omitted in the case where the matrix resin is a thermosetting resin. That is, it is possible to demold a molded plate body from a mold without waiting for cooling of the mold after finishing a hot press molding step, and a big increase of productivity of desired plate body is brought about when a thermosetting resin is used as the matrix resin. What the mold temperature T is substantially constant means that a mold temperature variation is within the range of ±10° C.

It is preferable that the fiber reinforced plastic (plate body) is produced in a condition in which the mold temperature T and exothermic peak temperature Tp of the thermosetting resin based on a differential scanning colorimetry determination (DSC) satisfy the following equation (I):

$$Tp-60 \leq T \leq Tp+20 \quad (I).$$

It is more preferable to satisfy the following equation (II):

$$Tp-30 \leq T \leq Tp \quad (II).$$

In the case where the mold temperature T is lower than Tp−60, a time necessary for curing resin becomes very long, and the curing is insufficient also in some cases. On the other hand, in the case where it is higher than Tp+20, it is not preferable since, by a rapid reaction of the resin, a void generation in the resin and a defective curing are caused. The exothermic peak temperature Tp based on DSC is a value measured in condition of heating speed of 10° C./min.

It is preferable that the fiber reinforced plastic (plate body) is produced in a condition that the lowest viscosity of the thermosetting resin based on a dynamic mechanical analysis (DMA) is 0.1 to 100 Pa·s. More preferably, it is 0.1 to 10 Pa·s. In the case where the lowest viscosity is less than 0.1 Pa·s, the resin flows only when it is pressed, and the reinforcing fiber is not filled sufficiently up to the tip end of the protrusion portion in some cases. On the other hand, in the case where it is larger than 100 Pa·s, since flowability of the resin is poor, the reinforcing fiber and the resin are not filled sufficiently up to the tip end of the protrusion portion in some cases. The lowest viscosity based on DMA is a value measured in condition of heating speed of 1.5° C./min.

As examples of the reinforcing fiber sheet, in which the reinforcing fibers of fiber length 10 to 100 mm are arranged in a predetermined direction, are arranged in length direction, for example, it may be a structure in which discontinuous reinforcing fibers obtainable by spinning means such as a draft zone system spinning are made into a sheet (example A), or may be a structure in which discontinuous reinforcing fibers (e.g., chopped fibers) are arranged unidirectionally and made into a sheet (example B), or may be a structure in which intermittent cuts of a limited length of a direction crossing the reinforcing fibers are made on all area of a unidirectional prepreg sheet constituted with the continuous reinforcing fibers (example C).

The draft zone system spinning is one of spinning methods in which fibers are cut into a short fiber unit by adding a tension to continuous fibers in a strand state, and it has a characteristic that cut points on the short fibers are not concentrated in one position to uniformly disperse along the whole length of the strand. The example A is a method in which an assembly is formed by arranging cut ends of the reinforcing fibers such that they do not assemble in single fiber unit, and since reinforcing fibers flow in single fiber unit, although its moldability is slightly inferior, since stress transmission is done very effectively, a development of a very high mechanical characteristics is possible, and since cut portions of the reinforcing fiber are dispersed, an excellent quality stability can be realized.

The example B is a method in which cut ends of the reinforcing fibers are assembled in plural fibers unit, and arranged fairly regularly to form an assemble, and since it inevitably generates unevenness of arrangement, distribution or the like of the reinforcing fibers, its quality stability is slightly inferior, but since it flows in plural fibers unit, a very excellent moldability can be realized.

The example C is a method in which cut ends of the reinforcing fibers are assembled in plural fibers unit, and arranged regularly to form an assemble, and since the reinforcing fibers are regularly arranged, it is excellent in quality stability and mechanical characteristics, and since it flows in plural fibers unit, moldability is also excellent.

The above-described each example can appropriately selected depending on its use, but among them, the example C which is excellent in balance between mechanical characteristics and moldability and can be produced simply, can be said to be the most preferable example.

As a method for making cuts into the reinforcing fibers to segment the reinforcing fibers, to make the plural reinforcing fibers arranged in a predetermined direction into a reinforcing fiber sheet in which reinforcing fibers having a fiber length of 10 to 100 mm are arranged in length direction, to the intermediate base material of unidirectional prepreg sheet or unidirectional semipreg sheet or the like constituted with the plural reinforcing fibers arranged in a predetermined direction and a resin, a method of making cuts by a manual operation by using a cutter, or by a mechanical operation by using a cutting machine (method A), a method in which the above-mentioned intermediate base material is punch-cut with a punch cutter blade arranged in a predetermined position (method B), or a method of continuously making cuts by a rotating roller provided with a blade at a predetermined position, in a production step of the intermediate base material (method C) are mentioned.

In the case where the reinforcing fibers are cut simply, the method A is, in the case where it is mass produced in consideration of productivity, the method B is, and in the case where it is mass produced more, the method C is suitable.

As the reinforcing fiber, carbon fiber is preferable. Carbon fiber has a low specific gravity, in addition, has especially excellent properties in specific strength and specific modulus, and furthermore, is also excellent in heat resistance and chemical resistance, and accordingly, it is suitable as members such as automotive body panel of which weight reduction is desired. Among them, PAN-based carbon fiber from which a high strength carbon fiber can easily be obtained is preferable.

As applications of the fiber reinforced plastic (plate body), bicycle members such as crank or frame, sports members such as shaft or head of golf club, automotive members such as door, sheet, member, module or frame, machine parts such as robot arm, in which strength, rigidity and lightness are desired, are mentioned. Among them, it is preferably used as automotive members such as sheet panel, sheet frame, front end module or door inner module, bicycle members such as crank, in which, in addition to strength and lightness, member shape is complicated and shape moldability with other members is desired.

Next, with reference to examples and comparative examples, this disclosure is further explained, but this disclosure is not especially limited thereto. Method of preparation of unidirectional prepreg sheet:

An epoxy resin composition was obtained by the following procedure:
(a) Epoxy resin ("Epikote (trademark)" 828: 30 parts by weight, Epikote 1001: 35 parts by weight, Epikote 154: 35 parts by weight, produced by Japan Epoxy Resins Co., Ltd.) and thermoplastic resin, polyvinyl formal ("Vinylec (trademark)" K produced by Chisso Corp.) 5 parts by weight were stirred for 1 to 3 hours while heating at 150 to 190° C., to dissolve the polyvinyl formal uniformly.
(b) After lowering the resin temperature to 55 to 65° C., curing agent, dicyandiamide (DICY7 produced by Japan Epoxy Resins Co., Ltd.) 3.5 parts by weight and curing accelerator, 3-(3,4-dichlorophenyl)-1,1-dimethyl urea (DCMU99 produced by Hodogaya Chemical Co., Ltd.) 4 parts by weight were added, and after kneading at the temperature for 30 to 40 minutes, the content Was taken out from the kneader to obtain an epoxy resin composition.

The obtained epoxy resin composition was coated on a release paper by using a reverse roll coater, to prepare a resin film.

Next, to carbon fibers (tensile strength 4,900 MPa, tensile modulus 235 GPa) unidirectionally arranged in a sheet state, two sheets of the resin film were superposed from both sides of the carbon fibers, and heated and pressed to impregnate with the resin composition, and prepared a unidirectional prepreg sheet of a carbon fiber unit weight 150 g/m$^2$ and a resin weight ratio 33%.

Exothermic peak temperature Tp of the obtained epoxy resin composition based on DSC was 152° C. As a measuring instrument, by using DSC2910 (product number) produced by T.A. Instruments Ltd., it was measured in a condition of heating speed of 10° C./min.

The lowest viscosity based on DMA was 0.5 Pa·s. As a measuring instrument, by using a dynamic viscoelastic properties measuring instrument "ARES" produced by T.A. Instruments Ltd., the lowest viscosity was determined from a relation curve between temperature and viscosity in a condition of heating speed 1.5° C./min, vibration frequency 0.5 Hz and parallel plate (diameter 40 mm).

Evaluation Method of Mechanical Characteristics:

Mechanical characteristics were evaluated by a bending rigidity measurement by 3-point bending test. From a molded article having a rib, a test piece was obtained by cutting out in a shape of length 100±1 mm and width 30±0.2 mm such that the rib is continuous in the test piece length direction, and in addition, locates at the center portion of the test piece.

The obtained test piece was set with the rib facing downward (supporting point side), and adjusted such that the distance of supporting points was 80 mm, and the supporting points were supported by the plate portion. By using a universal testing machine 4208 produced by Instron Corp. as a measuring instrument, 3-point bending test was carried out by a condition of cross-head speed 2.0 mm/min. Number of test piece measured was n=5. From the obtained load-deflection curve, bending rigidity was calculated, and evaluated by the value divided by the test piece weight (specific bending rigidity).

EXAMPLE 1

Figure 6:
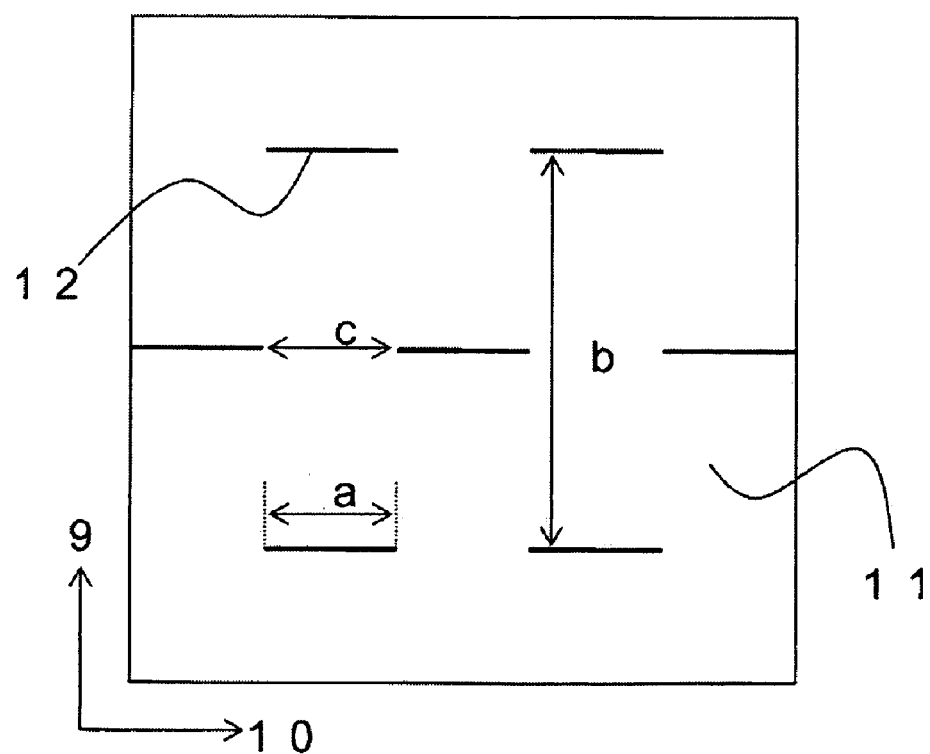
FIG. 6 is a schematic plain view of an example of a prepreg base material constituted with unidirectionally arranged reinforcing fibers and a matrix resin used in the production of the fiber reinforced plastic.

In accordance with the prepreg preparation method, a unidirectional prepreg sheet 11 shown in FIG. 6 was prepared. In FIG. 6, the direction of arrangement of plural reinforcing fibers (fiber length direction) in the unidirectional prepreg sheet 11 is shown by the arrow 9 (up and down direction in FIG. 6), and the orthogonal direction to the direction of arrangement of the reinforcing fibers (orthogonal to fiber direction) is shown by the arrow 10 (right and left direction in FIG. 6). In the unidirectional prepreg sheet 11, by using an automatic cutting machine, regular cuts 12 of the same interval such as shown in FIG. 6 were made continuously in orthogonal direction to the fibers. In FIG. 6, width of each cut a was 10 mm, interval (pitch) b of each cut in fiber length direction, that is, cut length of the reinforcing fibers, was 30 mm, and interval c between adjacent cuts in orthogonal direction to the fibers was 10 mm.

From the unidirectional prepreg sheet 11 thus prepared, sixteen sheets of prepreg base material of which size of one sheet was 300×300 mm were cut out. These were laminated to be quasi-isotropic as a whole ([+45/0/−45/90]$_{2S}$), to prepare a prepreg laminate. The prepreg base materials laminated in the prepreg laminate are sixteen sheets, but in 90° layer of the center layer, since two sheets of the same fiber direction were superposed, the number of laminate is handled as fifteen layers.

Figure 7:
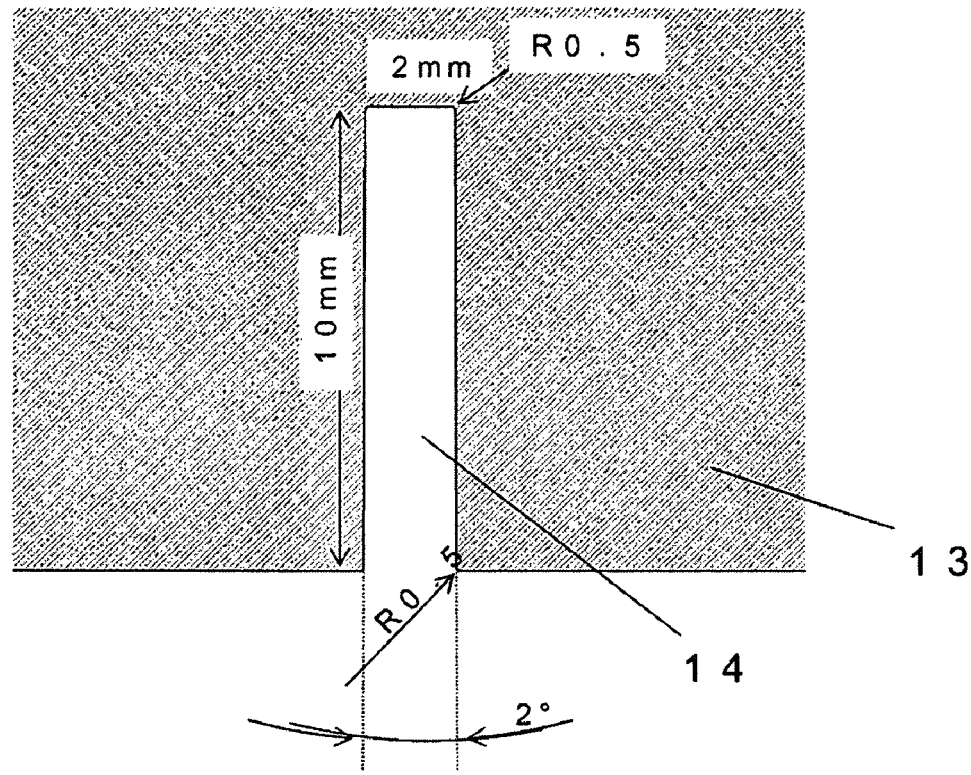
FIG. 7 is a schematic longitudinal cross-sectional view of an example of mold, having a groove portion for forming the protrusion portion, of a molding device used for production of the fiber reinforced plastic.
Figure 8:
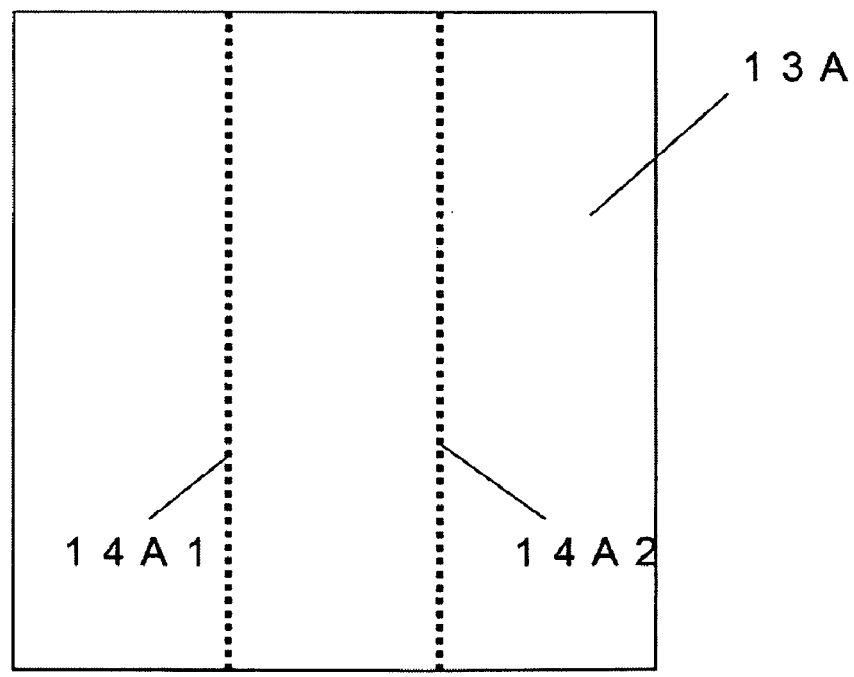
FIG. 8 is a schematic plan view of a mold explaining an example of arrangement of a groove portion of a mold, having a groove portion for forming the protrusion portion, of a molding device used for production of the fiber reinforced plastic.

A mold shown in FIG. 8 was prepared, in which two of a groove (rib groove) 14 for forming the protrusion portion (rib) shown in FIG. 7 are provided spaced apart each other. In FIG. 8, a mold 13A has two grooves 14A1 and 14A2 for forming rib. This mold 13A is used as the upper mold explained next.

After the prepreg laminate prepared in the above was set in a lower mold having an area of 300×300 mm, by a heating type press molding machine equipped with the upper mold 13A, the prepreg laminate was subjected to a heating, pressing and shaping treatment in a molding condition of pressing of pressure 6 MPa, heating of heating temperature 150° C., molding of molding time 30 minutes, to cure the matrix resin, and obtained a plate-like molded article (plate body) having a rib.

In the obtained plate body, a thickness of a plate portion 1t was 2.0 mm, the reinforcing fibers were filled up to the tip end of the rib, and when a cross-section of the rib was observed, it was confirmed that, as shown in FIG. 1, a laminate structure was formed in the rib, and the reinforcing fibers in the laminate structure were continuous from the reinforcing fibers in the laminate structure of the plate portion, and eight layers which form the rib were provided as layers having the same shape as the rib, that is, a shape corresponding to both sides and top of the rib.

As a result of 3-point bending test, specific bending rigidity of the obtained plate body was a very high value as 1,100 (kN·mm$^2$/g).

EXAMPLE 2

Figure 9:
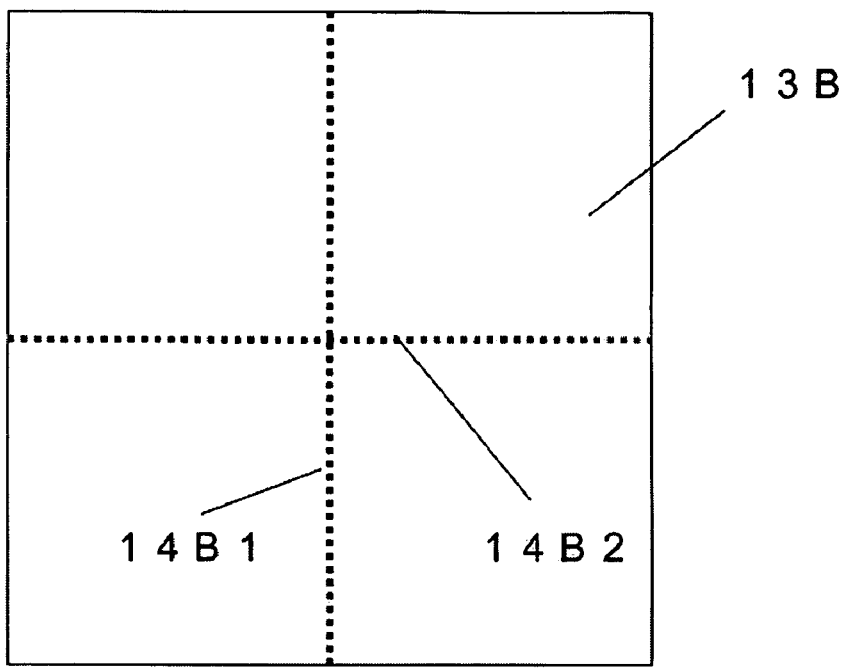
FIG. 9 is a schematic plan view of a mold explaining another example of arrangement of a groove portion of a mold, having a groove portion for forming the protrusion portion, of a molding device used for production of the fiber reinforced plastic.

A molded article (plate body) was prepared in the same way as Example 1, except using an upper mold 13B in which the position of groove for forming the protrusion portion of the upper mold is changed to cross-shaped grooves 14B1 and 14B2 as shown in FIG. 9.

In the obtained plate body, thickness of plate portion 1t was 2.0 mm, the reinforcing fibers were filled up to the tip end of the rib, and when a cross-section of the rib was observed, it was confirmed that, as shown in FIG. 1, a laminate structure was formed in the rib, and the reinforcing fibers in the laminate structure were continuous from the reinforcing fibers in the laminate structure of the plate portion, and eight layers of the rib, locate as layers having the same shape as the rib, that is, a shape corresponding to both sides and top of the rib.

As a result of 3-point bending test, specific bending rigidity of the obtained plate body was a very high value as 1,050 (kN·mm$^2$/g).

COMPARATIVE EXAMPLE 1

A plate-like molded article (plate body) was obtained in the same way as Example 1, except not making the cuts in the unidirectional prepreg sheet.

In the obtained plate body, thickness of the plate portion was 2.3 mm, and in the rib, in approximately 50% portion, filling of the reinforcing fiber was defective. When cross-section of the rib was observed, it was found that approximately 80% portion of the formed rib is formed with the resin, and the reinforcing fiber layers which constitute the laminate structure of the rib was not a shape extending along the shape of the rib.

As a result of 3-point bending test, specific bending rigidity of the obtained plate body was very low as 150 (kN·mm$^2$/g).

COMPARATIVE EXAMPLE 2

A plate-like molded article (plate body) was obtained in the same way as Example 1, except using an upper mold which does not have a groove for forming protrusion portion.

Thickness of the obtained plate body was 2.4 mm. From the obtained plate body, two plate-like pieces of 10 mm width were cut out. Next, to make into a shape similar to the plate body of Example 1, by using a two-liquid type epoxy-based adhesive, to surface of the plate body obtained in this comparative example, the two plate-like pieces were bonded, to prepare a plane plate body having ribs. To enhance adhesion of the bonded portion, before bonding the plate-like pieces, the portion to be bonded was subjected to a sandblast treatment.

Figure 10:
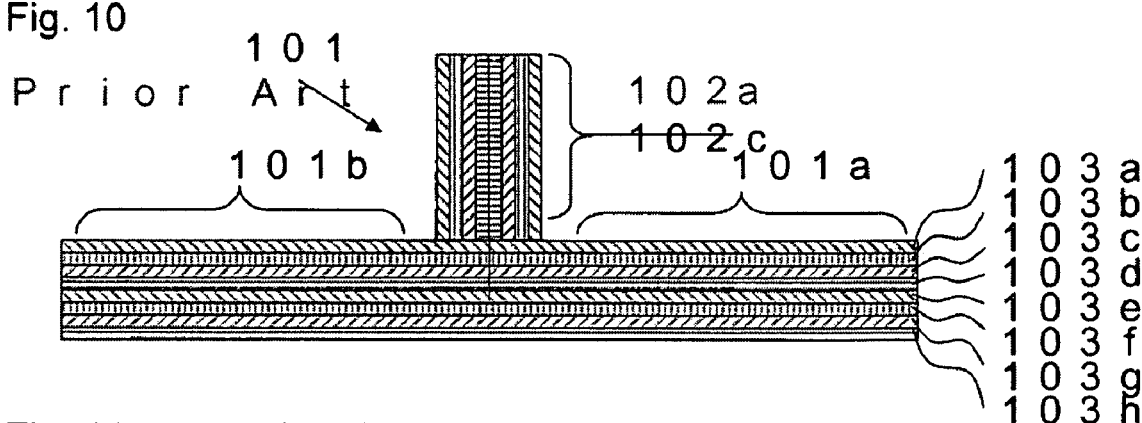
FIG. 10 is a schematic longitudinal cross-sectional view of another example of conventional fiber reinforced plastics.

A longitudinal cross-sectional view in the vicinity of one rib of the obtained plate body having ribs is shown in FIG. 10. In FIG. 10, the plate body 101 is constituted with plate portions 101a and 101b and the protrusion portion (rib) 102a formed by bonding the plate-like pieces. The plate portions 101a and 101b are formed with reinforcing fiber layers 103a, 103b, 103c, 103d, 103e, 103f, 103g and 103h in which a matrix resin co-exists.

When a cross-section of the rib 102a was observed, as shown in FIG. 10, the rib 102a has a laminate structure, but the reinforcing fibers in the laminate structure of the rib 102a and the reinforcing fibers in the laminate structure of the plate portions 101a and 101b are not continuous, furthermore, at the tip end of the rib 102a, continuity of each layer constituting the laminate structure was stopped, and the each layer had not a shape extending along the shape of the rib 102a.

As a result of 3-point bending test, just after starting the test, the rib 102a was peeled off from the plate portion 101a, and specific bending rigidity of the plate body 101 was a very low value as 80 (kN·mm$^2$/g).

COMPARATIVE EXAMPLE 3

Eight sheets of the prepreg base material prepared in Example 1 were laminated into [+45/0/−45/90]$_2$, to prepare a prepreg laminate A. From the prepared prepreg laminate A, two pieces of prepreg laminate B of which size were 300×20 mm were cut out.

Next, the obtained two prepreg laminates B were inserted in the groove of the same upper mold as Example 1 by folding in half such that the respective 90° layers were inside, and the folded side was at the tip end of the groove, and after the prepreg laminate A was arranged in a lower mold having an area of 300×300 mm, to prepare a plate-like molded article (plate body) having a rib in the same condition as Example 1.

Figure 11:
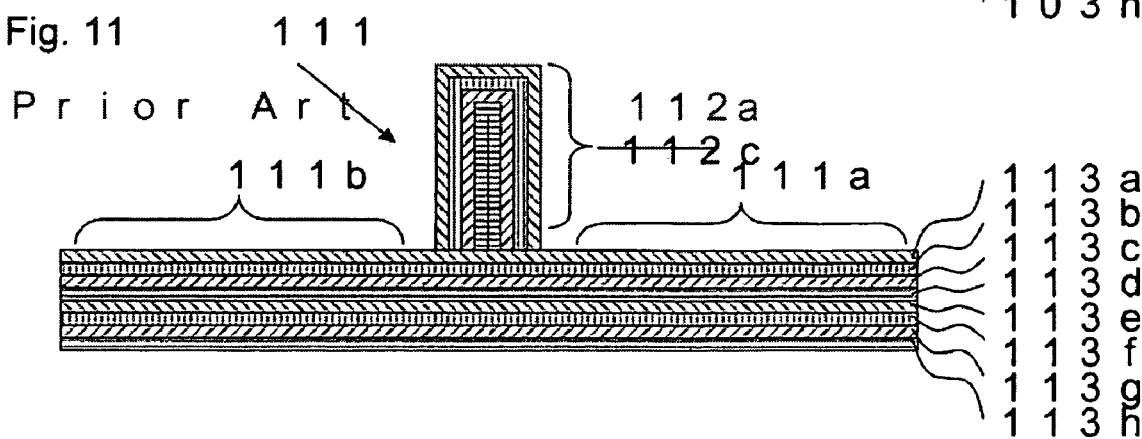
FIG. 11 is a schematic longitudinal cross-sectional view of still another example of conventional fiber reinforced plastics.

A longitudinal cross-sectional view in the vicinity of one rib of the prepared plate body is shown in FIG. 11. In FIG. 11, the plate body 111 is constituted with the plate portions 111a and 111b and the protrusion portion (rib) 112a. The plate portion 111a is formed with the reinforcing fiber layers 113a, 113b, 113c, 113d, 113e, 113f, 113g and 113h in which a matrix resin co-exists.

When a cross-section of the rib 112a was observed, as shown in FIG. 11, it was found that the rib 112a has a laminate structure and eight layers have a shape extending along the shape of rib 112a, but the reinforcing fibers in the laminate structure of the rib 112a and the reinforcing fibers in the laminate structure of the plate portion 111a were not continuous.

As a result of 3-point bending test, just after starting the test, the rib 112a was peeled off from the plate portion 111a, and specific bending rigidity of the plate body 111 was a very low value as 100 (kN·mm$^2$/g).

COMPARATIVE EXAMPLE 4

By using the same carbon fiber (number of filaments, 12,000 fibers) and the epoxy resin composition used in Example 1, an SMC sheet of a fiber length 25 mm, a carbon fiber unit weight 750 g/m$^2$ and a resin weight ratio 50% was prepared. The SMC sheet was cut out into a size of 300×300 mm, two sheets of them were laminated, to prepare a plate-like molded article (plate body) having two straight-lined ribs in the same condition as Example 1.

The obtained plate body had a thickness of the plate portion of 2.0 mm, and the fibers were filled up to the tip end of the rib, but when a cross-section of the rib was observed, it was found that the reinforcing fibers are respectively piled independently at random orientation, and in respective portions of the plate portion and the rib, clear layers of the reinforcing fibers are not formed in respective thickness directions.

As a result of 3-point bending test, specific bending rigidity of the obtained plate body was very low as 250 (kN·mm$^2$/g).

INDUSTRIAL APPLICABILITY

In a fiber reinforced plastic, each layer which constitutes the laminate structure of the plate portion and the protrusion portion contains discontinuous reinforcing fibers together, and in addition, at least a part of the reinforcing fibers extend from the plate portion to the protrusion portion, and at least one of the layers constituting the laminate structure of the protrusion portion has a shape extending along a shape of the protrusion portion. By this structure, the protrusion portion of the fiber reinforced plastic has desired mechanical characteristics.

According to a method for producing a fiber reinforced plastic, especially, decrease in production process of mechanical characteristics of protrusion portion such as rib or boss which is important in constitution of a structural member, can be minimized, and in addition, the fiber reinforced plastic can be produced simply.

A fiber reinforced plastic is preferably used, for example, as a structural member of transport equipments (such as cars, aircrafts or ships), a structural member of industrial machines, a structural member of precision instruments or a structural member of sporting goods (such as bicycle or golf).

The invention claimed is:

1. A fiber reinforced plastic comprising a plate body having a plate portion and a protrusion portion rising from at least one surface of the plate portion, in which the plate portion and the protrusion portion comprise plural reinforcing fibers and a matrix resin integrated with the plural reinforcing fibers, wherein
   (a) the plural reinforcing fibers in the plate portion and the protrusion portion are formed of at least two reinforcing fiber layers arranged such that the plural reinforcing fibers in the respective layers extend in different directions,
   (b) respective fiber lengths of the plural reinforcing fibers in each of the reinforcing fiber layers is 10 to 100 mm,
   (c) at least a part of the reinforcing fibers in each of the reinforcing fiber layers extend continuously from the plate portion to the protrusion portion, and
   (d) at least one reinforcing fiber layer of the at least two reinforcing fiber layers in the protrusion portion has a shape extending along a shape of the protrusion portion.

2. The fiber reinforced plastic according to claim 1, wherein the plate portion contains a reinforcing fiber base layer integrated with the plate portion on the surface opposite to the surface on which the protrusion portion locates, wherein reinforcing fibers in the reinforcing fiber base layer are plural continuous reinforcing fibers.

3. The fiber reinforced plastic according to claim 1, wherein a thickness of the protrusion portion is 0.1 to 4 times of a thickness of the plate portion.

4. The fiber reinforced plastic according to claim 1, wherein a height of the protrusion portion is 0.2 to 50 times of a thickness of the plate portion.

5. The fiber reinforced plastic according to claim 1, wherein a transversal cross-sectional shape of the protrusion portion is a rectangle or circle.

6. The fiber reinforced plastic according to claim 1, wherein the matrix resin is a thermosetting resin.

7. The fiber reinforced plastic according to claim 1, wherein the reinforcing fiber is a carbon fiber.

8. The fiber reinforced plastic according to claim 1, wherein the plural reinforcing fibers are longitudinally oriented within the respective layers.

9. The fiber reinforced plastic according to claim 1, wherein the at least two fiber reinforcing layers are laminated.

* * * * *